(12) United States Patent
Reimnitz

(10) Patent No.: US 10,843,557 B2
(45) Date of Patent: Nov. 24, 2020

(54) HYBRID MODULE AND DRIVE ARRANGEMENT FOR A MOTOR VEHICLE

(71) Applicant: Schaeffler Technologies AG & Co. KG, Herzogenaurach (DE)

(72) Inventor: Dirk Reimnitz, Buehl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/096,337

(22) PCT Filed: Apr. 25, 2017

(86) PCT No.: PCT/DE2017/100336
§ 371 (c)(1),
(2) Date: Oct. 25, 2018

(87) PCT Pub. No.: WO2017/186226
PCT Pub. Date: Nov. 2, 2017

(65) Prior Publication Data
US 2019/0126746 A1  May 2, 2019

(30) Foreign Application Priority Data

Apr. 27, 2016  (DE) .................. 10 2016 207 104

(51) Int. Cl.
*B60K 17/02* (2006.01)
*B60K 6/40* (2007.10)
(Continued)

(52) U.S. Cl.
CPC ............... *B60K 17/02* (2013.01); *B60K 6/40* (2013.01); *B60K 6/48* (2013.01); *F16D 25/0638* (2013.01);
(Continued)

(58) Field of Classification Search
CPC . B60K 17/02; B60K 6/48; B60K 6/40; B60K 2006/4816; F16D 25/0638; Y02T 10/6256
See application file for complete search history.

(56) References Cited

U.S. PATENT DOCUMENTS 5,829,566 A * 11/1998 Winks ................... F16D 13/648
  192/70.12
6,354,974 B1 * 3/2002 Kozarekar ............... B60K 6/26
  180/65.21
(Continued)

FOREIGN PATENT DOCUMENTS

DE   10 2010 003 442 A1   10/2011
EP       1 800 929         6/2007
(Continued)

*Primary Examiner* — Jacob B Meyer
(74) *Attorney, Agent, or Firm* — Davidson, Davidson & Kappel, LLC

(57) ABSTRACT

A hybrid module is for a motor vehicle and is configured for coupling an internal combustion engine. The hybrid module includes a connection device (10) for the mechanical coupling of an internal combustion engine; a separating clutch (30), by which torque can be transmitted from the internal combustion engine to the hybrid module (1); an electric motor (40) for producing a drive torque having a hollow-cylindrical rotor (42); a dual clutch device (50), by which torque can be transmitted from the electric motor (40) and/or from the separating clutch (30) to a drive train, having a first component clutch (60) and a second component clutch (70); a separating clutch actuation system (35) for actuating the separating clutch (30); a first actuation system (61) for actuating the first component clutch (60) and a second actuation system (71) for actuating the second component clutch (70), wherein the connection device (10), the separating clutch (30) and the first component clutch (60) and/or the second component clutch (70) are arranged substantially in series along an arrangement direction (2), and at least a (Continued)

section of at least one of the clutches, namely the separating clutch (30), the first component clutch (60) and the second component clutch (70), is arranged within the space (43) enclosed by the rotor (42). Along the arrangement direction (2), the separating clutch actuation system (35) and the first actuation system (61) are arranged on the side of the electric motor (40) which faces the connection device (2).

20 Claims, 6 Drawing Sheets

(51) Int. Cl.
  *F16D 25/0638* (2006.01)
  *B60K 6/48* (2007.10)

(52) U.S. Cl.
  CPC ... *B60K 2006/4816* (2013.01); *Y02T 10/6256* (2013.01)

(56) References Cited

U.S. PATENT DOCUMENTS

| | | | | |
|---|---|---|---|---|
| 6,474,428 B1 * | 11/2002 | Fujikawa | | B60K 6/365 180/65.25 |
| 7,485,061 B2 * | 2/2009 | Reisch | | B60K 6/387 475/5 |
| 7,815,026 B2 * | 10/2010 | Povirk | | F16H 45/02 192/3.26 |
| 7,832,537 B2 * | 11/2010 | Blessing | | B60K 6/387 192/48.611 |
| 8,146,726 B2 * | 4/2012 | McCutcheon | | F16D 13/385 192/70.28 |
| 8,221,279 B2 * | 7/2012 | Reed | | B60K 6/365 192/83 |
| 8,267,208 B2 * | 9/2012 | Kleuker | | B60K 6/40 180/65.22 |
| 8,322,503 B2 * | 12/2012 | Combes | | B60K 6/26 192/48.8 |
| 8,333,680 B2 * | 12/2012 | Kasuya | | B60W 20/15 477/5 |
| 8,337,171 B2 * | 12/2012 | Agner | | B60K 6/36 417/319 |
| 8,376,905 B2 * | 2/2013 | Kasuya | | B60K 6/387 477/5 |
| 8,444,519 B2 * | 5/2013 | Borntraeger | | B60K 6/26 475/5 |
| 8,453,817 B2 * | 6/2013 | Schrage | | B60K 6/26 192/48.611 |
| 8,757,305 B2 * | 6/2014 | Roske | | B60K 6/38 180/65.22 |
| 8,840,523 B2 * | 9/2014 | Tajima | | B60K 6/387 477/5 |
| 8,863,617 B2 * | 10/2014 | Holder | | B60K 6/38 192/48.619 |
| 8,968,137 B2 * | 3/2015 | Bausch | | B60K 1/00 180/65.6 |
| 9,193,255 B2 * | 11/2015 | Arnold | | B60K 6/36 |
| 9,950,605 B2 * | 4/2018 | Suyama | | B60K 6/387 |
| 10,511,207 B2 * | 12/2019 | Chamberlin | | B60K 6/485 |
| 2003/0089569 A1 * | 5/2003 | Antonov | | F16D 25/0638 192/48.92 |
| 2003/0183474 A1 * | 10/2003 | Heidenreich | | F16D 25/0638 192/70.2 |
| 2005/0044978 A1 * | 3/2005 | Obinata | | F16H 3/093 74/421 R |
| 2006/0000684 A1 * | 1/2006 | Agner | | F16D 21/06 192/48.8 |
| 2006/0130601 A1 * | 6/2006 | Hughes | | B60K 6/36 74/340 |
| 2006/0144665 A1 * | 7/2006 | Janson | | B60K 6/48 192/48.8 |
| 2007/0175723 A1 * | 8/2007 | Blessing | | B60K 6/387 192/48.8 |
| 2007/0205076 A1 * | 9/2007 | Takahashi | | C04B 35/83 192/108 |
| 2008/0023287 A1 * | 1/2008 | Thiede | | B60K 6/26 192/48.1 |
| 2011/0240384 A1 * | 10/2011 | Roske | | B60K 6/38 180/65.22 |
| 2011/0259698 A1 * | 10/2011 | Arnold | | B60K 6/36 192/48.1 |
| 2014/0231174 A1 * | 8/2014 | Iwase | | B60K 6/405 184/6.12 |
| 2019/0126746 A1 * | 5/2019 | Reimnitz | | B60K 6/40 |
| 2019/0211889 A1 * | 7/2019 | Reimnitz | | B60K 6/387 |
| 2020/0039340 A1 * | 2/2020 | Keller | | B60K 6/387 |
| 2020/0055386 A1 * | 2/2020 | Reimnitz | | B60K 6/26 |

FOREIGN PATENT DOCUMENTS

| | | |
|---|---|---|
| FR | 2 814 121 | 3/2002 |
| FR | 2 830 590 | 4/2003 |
| WO | WO2015149804 | 10/2015 |

\* cited by examiner

HYBRID MODULE AND DRIVE ARRANGEMENT FOR A MOTOR VEHICLE

The present disclosure relates to a hybrid module for a motor vehicle, such as a passenger car, a heavy goods vehicle or some other commercial vehicle, for coupling to an internal combustion engine, and to a drive arrangement for a motor vehicle having the hybrid module according to the present disclosure.

The hybrid module comprises a connection device for the mechanical coupling of an internal combustion engine, a separating clutch, by means of which torque can be transmitted from the internal combustion engine to the hybrid module, and by means of which the hybrid module can be separated from the internal combustion engine, an electric motor for producing a drive torque having a hollow-cylindrical rotor, and a dual clutch device, by means of which torque can be transmitted from the electric motor and/or from the separating clutch to a drive train. The dual clutch device comprises a first component clutch and a second component clutch. Each clutch provided is assigned an actuation system.

By means of the hybrid module according to the present disclosure, a torque produced by the internal combustion engine can be transmitted to the drive train via the separating clutch and the dual clutch device.

BACKGROUND

Hybrid modules that are currently available, which can combine electric motor operation with internal combustion engine operation by coupling an internal combustion engine to a drive train of a vehicle, generally comprise an electric motor, a separating clutch, the actuation system for the latter, bearings and housing components, which connect the three main components to form a functional unit. The electric motor allows electric driving, a power boost for internal combustion engine operation, and energy recovery. The separating clutch and the actuation system thereof provide for the coupling or decoupling of the internal combustion engine.

In order to transmit the torque of a hybrid module, which is to be arranged between the internal combustion engine and the transmission, to the transmission, irrespective of whether it is produced by means of the electric motor and/or by means of the internal combustion engine, an additional unit is required, by means of which torque transmission can be controlled. A torque converter, a clutch, a continuously variable transmission (CVT) and/or a dual clutch (wet or dry) is/are therefore arranged between the hybrid module and the transmission in "hybrid vehicles" fitted with hybrid modules of this kind.

If a hybrid module is combined with a dual clutch in such a way that the hybrid module is situated between the internal combustion engine and the transmission in the torque transmission direction, the internal combustion engine, the hybrid module, the dual clutch with the actuation systems thereof, and the transmission must be arranged one behind the other or next to one another in the vehicle.

A hybrid module positioned in this way is also referred to as a P2 hybrid module. However, an arrangement of this kind very often leads to considerable problems with installation space. Currently, development is therefore heading toward no longer embodying the "P2 hybrid module" and the dual clutch as two separate units and arranged them next to one another but instead developing a hybrid module with an integrated dual clutch. This makes it possible to arrange all the required components in an even more compact and functional way.

In order to achieve a very compact hybrid module with an integrated dual clutch, one advantageous construction principle consists in arranging the separating clutch and the two component clutches of the dual clutch directly next to one another. Another advantageous construction principle consists in arranging clutches completely or partially radially within the electric motor, as also disclosed, for example, in DE 10 2010 003 442 A1 and in DE10 2015 223 330 A1 (not yet published), which furthermore teaches that actuation systems are arranged between the separating clutch and the main clutch.

SUMMARY OF THE INVENTION

Dual clutches have also proven their worth in combination with a hybrid drive. However, clutches of this type need further refinement. Owing to their large-scale use, however, there is also the demand for low-cost manufacture and optimum usage of installation space.

On this basis, it is an underlying object of the present disclosure to make available a hybrid module and a drive arrangement fitted with the hybrid module for a motor vehicle, combining reliable functionality with low production costs and a small overall volume.

It should be noted that the expression "arranged on the side" or similar in the text below should be understood to mean that arrangement is closer to that side than to another side opposite said first side.

The hybrid module according to the present disclosure is designed for a motor vehicle for the purpose of coupling an internal combustion engine and comprises a connection device for the mechanical coupling of an internal combustion engine, a separating clutch, by means of which torque can be transmitted from the internal combustion engine to the hybrid module, and by means of which the hybrid module can be separated from the internal combustion engine, an electric motor for producing a drive torque having a hollow-cylindrical rotor, a dual clutch device, by means of which torque can be transmitted from the electric motor and/or from the separating clutch to a drive train. The dual clutch device is fitted with a first component clutch and a second component clutch. In the sense according to the present disclosure, the terms "first component clutch" and "second component clutch" do not relate to specific speeds of a connected transmission. Furthermore, the hybrid module comprises a separating clutch actuation system for actuating the separating clutch, a first actuation system for actuating the first component clutch and a second actuation system for actuating the second component clutch. The connection device, the separating clutch and the first component clutch and/or the second component clutch are arranged substantially in series along an arrangement direction. At least a section of at least one of the clutches, namely the separating clutch, the first component clutch and the second component clutch, is arranged within the space enclosed by the rotor. Along the arrangement direction, the separating clutch actuation system and the first actuation system are arranged on the side of the electric motor which faces the connection device, i.e. the separating clutch actuation system and the first actuation system are closer to the side of the electric motor than to a side which is opposite to the side of the electric motor.

The connection device can be designed, for example, as a set of splines, to which a drive element of complementary design of an internal combustion engine to be coupled can transmit a torque.

Thus, according to the present disclosure, it is envisaged that at least one of the clutches, namely the separating clutch, the first component clutch and the second component clutch, is arranged in the space within the electric motor which is surrounded by the electric motor rotor of hollow-cylindrical design. This means that the respective clutch is arranged in that section of the length along the arrangement direction which is covered by the annular rotor on the axis of rotation thereof.

By virtue of this arrangement in the space enclosed by the rotor, the relevant clutch is thus arranged radially within the electric motor. At the same time, the possibility that only a section of at least one of the clutches is arranged within this space should not be excluded.

The separating clutch, the electric motor and the dual clutch device are preferably arranged precisely one behind the other and/or one inside the other in the torque transmission direction, in particular being arranged on a common ideal axis and thus all coaxially with respect to one another. Here, the arrangement direction preferably extends along the axis of rotation of the clutches, with the result that the connection device, the separating clutch, the first component clutch and the second component clutch are arranged coaxially on the axis of rotation along the arrangement direction.

At the same time, the possibility that a respective actuation system likewise extends axially in the region surrounded by the rotor of the electric motor should not be excluded. In an alternative embodiment, an actuation system is arranged outside the space surrounded by the electric motor.

In particular, the hybrid module according to the present disclosure can be embodied in such a way that at least a section of the first component clutch and the second component clutch is situated in the space delimited by the rotor of the electric motor.

The dual clutch device can be an "MDD" clutch of the kind disclosed in DE 10 2015 207 470 A1, for example. As an alternative, it can be lever-actuated, as taught by PCT/DE 2015/200242, and can have a plurality of friction disks or just one friction disk per clutch. Dual clutches having a plurality of disks per component clutch have the advantage that they are radially of smaller construction and are thus easier to nest radially within the rotor.

The present disclosure thus relates to a hybrid module in which the dual clutch is embodied and arranged in such a way that all three clutches are arranged next to one another and at least one of the clutches is arranged within the electric motor. It is thereby possible to make available a module which has a very small volume overall through the optimum usage of installation space. By virtue of this very small volume, the module according to the present disclosure can be integrated in a simple and flexible manner into existing drive trains, with the result that little effort is required to convert existing drive trains originally designed exclusively for internal combustion engine operation to hybrid operation.

In one embodiment of the hybrid module, the second actuation system for actuating the second component clutch is arranged on the side of the electric motor which faces the transmission. This embodiment makes it possible in a simple and reliable manner to actuate the two outer clutches by respective actuation systems, which are arranged at a very small spatial distance from the respective clutches.

However, the present present disclosure is not restricted to arranging the second actuation system on the side facing away from the connection device; on the contrary, the second actuation system, like the separating clutch actuation system and the first actuation system, can be arranged on the side of the electric motor which faces the connection device. Here, it is also possible for a section of this second actuation system too to be arranged within the electric motor or even next to it.

The hybrid module can furthermore be embodied in such a way that the second component clutch has a greater radial extent than the first component clutch and is arranged on the side of the electric motor which faces away from the connection device.

In this case, the second component clutch is preferably arranged axially outside the electric motor or the rotor thereof. Consequently, the second actuation system should also be arranged outside the electric motor in this embodiment. This embodiment and arrangement of the second component clutch is recommended since there is no need to pass an actuation element of one of the two other clutches around the second component clutch. Consequently, this second component clutch can be embodied with relatively large radial dimensions, thus allowing it to be arranged in a relatively narrow space and consequently in a space-saving manner next to the electric motor, despite being designed to match a certain torque to be transmitted by the overall hybrid module.

For actuation of the respective clutch, the actuation systems for the separating clutch and for the first component clutch should each have a force transmission device, in particular a pressure cylinder, and an actuation bearing, which in each case jointly form a unit and which are arranged as units radially and/or axially offset relative to one another.

Here, the radial and axial offset relate to a common axis of rotation. In particular, it is envisaged that the force transmission device and the actuation bearing of the first component clutch are arranged radially on the outside in relation to the force transmission device and to the actuation bearing of the separating clutch. This embodiment is even more advantageous in respect of the required installation space if the force transmission device and the actuation bearing of the separating clutch are arranged next to one another parallel to the arrangement direction and the force transmission device and the actuation bearing of the first component clutch are arranged radially offset relative to one another. This results in a very small volume requirement while ensuring the functionality of the clutches. Moreover, this allows relatively small actuation bearing diameters, thereby reducing bearing drag torques.

For the purpose of reducing the required components and to further reduce the volume, provision is made for the dual clutch device to have a counter plate, which performs a counter plate function both for the first component clutch and for the second component clutch. Here, opposite sides of the counter plate each serve as a friction surface for one of the component clutches.

In this case, the counter plate can be connected mechanically in a fixed manner to the rotor of the electric motor and can be arranged within the space enclosed by the stator of the electric motor, wherein a fastening portion, which is embodied with an offset such that it extends out of the space enclosed by the stator of the electric motor in the radial and axial directions, is arranged on the counter plate. This means that the counter plate is arranged on a section of the length which extends parallel to the axis of rotation of the rotor and which is covered by the stator. In order to ensure this arrangement, the fastening section of the counter plate is embodied with an offset over one or more clutch disks and optionally arranged intermediate plates. In this case, the fastening section is connected in a fixed manner to the rotor of the electric motor, preferably indirectly via a rotor carrier.

In an advantageous embodiment of the hybrid module, it is furthermore envisaged that the first actuation system has at least one bridging element, which extends on the radially outer side of the separating clutch for the purpose of actuating the first component clutch.

This means that the bridging element of the first actuation system bridges the separating clutch to actuate the first component clutch. This actuation element or "connecting element" can be a pressure pot or a tie rod, for example, depending on the direction of force. Here, the actuation of the separating clutch is preferably accomplished through a rotor carrier, which is configured for rotary mounting of the rotor of the electric motor. The bridging element of the actuation system of the first component clutch extends across the separating clutch and through the rotor carrier as well as through the counter plate of the separating clutch. By virtue of the arrangement opposite the separating clutch, the actuation of the second component clutch can be performed directly by the second actuation system without passing through some other component.

The use of a bridging element as a mechanical connection between an actuation system on the internal combustion engine side and the first component clutch, over the separating clutch, has the significant advantage of small installation space relative to actuation of the first component clutch by an actuation system arranged on the transmission side.

This bridging of the separating clutch is possible because the separating clutch can have a smaller diameter than the two component clutches of the dual clutch since it has only to transmit the torque produced by the internal combustion engine and does not have to transmit the total torque of the internal combustion engine and the electric motor like the dual clutch.

In this case, the arrangement of the bridging element as a mechanical connection between an actuation system on the internal combustion engine side and the first component clutch is not restricted to the embodiment of the present disclosure with the arrangement of all three clutches within the electric motor; on the contrary, this embodiment is also advantageous when not all three clutches are arranged within the electric motor but the second component clutch is arranged on the transmission side, outside the electric motor. This second component clutch can then be embodied with a relatively large clutch disk diameter, as a result of which the second component clutch is of axially narrower construction and can be arranged in a space-saving manner next to the electric motor.

This embodiment is then further optimized if the separating clutch has a pressure plate and/or intermediate plate and a translation guide, which is designed for the translational movement of the pressure plate and/or intermediate plate in the direction of a counter plate of the separating clutch, wherein the actuation system of the first component clutch has a plurality of bridging elements, and the translation guide is arranged between bridging elements in the circumferential direction.

If appropriate, a translation guide of this kind can be an integral part of a component arranged in a fixed location relative to the rotor of the electric motor. Since the bridging elements cannot be connected to one another in the circumferential direction over their respective lengths since they must project through openings in the rotor carrier and in the counter plate of the separating clutch, the translation guide for the separating clutch can be connected between these bridging or connecting elements to components fixed relative to the separating clutch, e.g. the rotor carrier or the counter plate, or can be designed as an integral part of these components.

At least one of the two actuation systems of the component clutches and/or of the separating clutch can have a lever mechanism for multiplying the contact pressure force.

By means of a lever mechanism of this kind, the torque that can be transmitted by the respective clutch can be increased. The lever elements used here are embodied as lever springs or diaphragm springs. This design is advantageous particularly with a radially large second component clutch since only relatively short actuation paths are required in this clutch and these paths can be achieved by the lever springs or diaphragm springs. It is thus possible to have recourse to a tried and tested and economical clutch design for at least one of the component clutches.

To achieve the object, a drive arrangement for a motor vehicle having an internal combustion engine and a hybrid module according to the present disclosure as well as a transmission is furthermore made available, wherein the hybrid module is connected mechanically to the internal combustion engine and the transmission by means of clutches.

BRIEF SUMMARY OF THE DRAWINGS

The present invention is explained below by means of illustrative embodiments illustrated in the attached drawings, in which.

DETAILED DESCRIPTION

Figure 1:
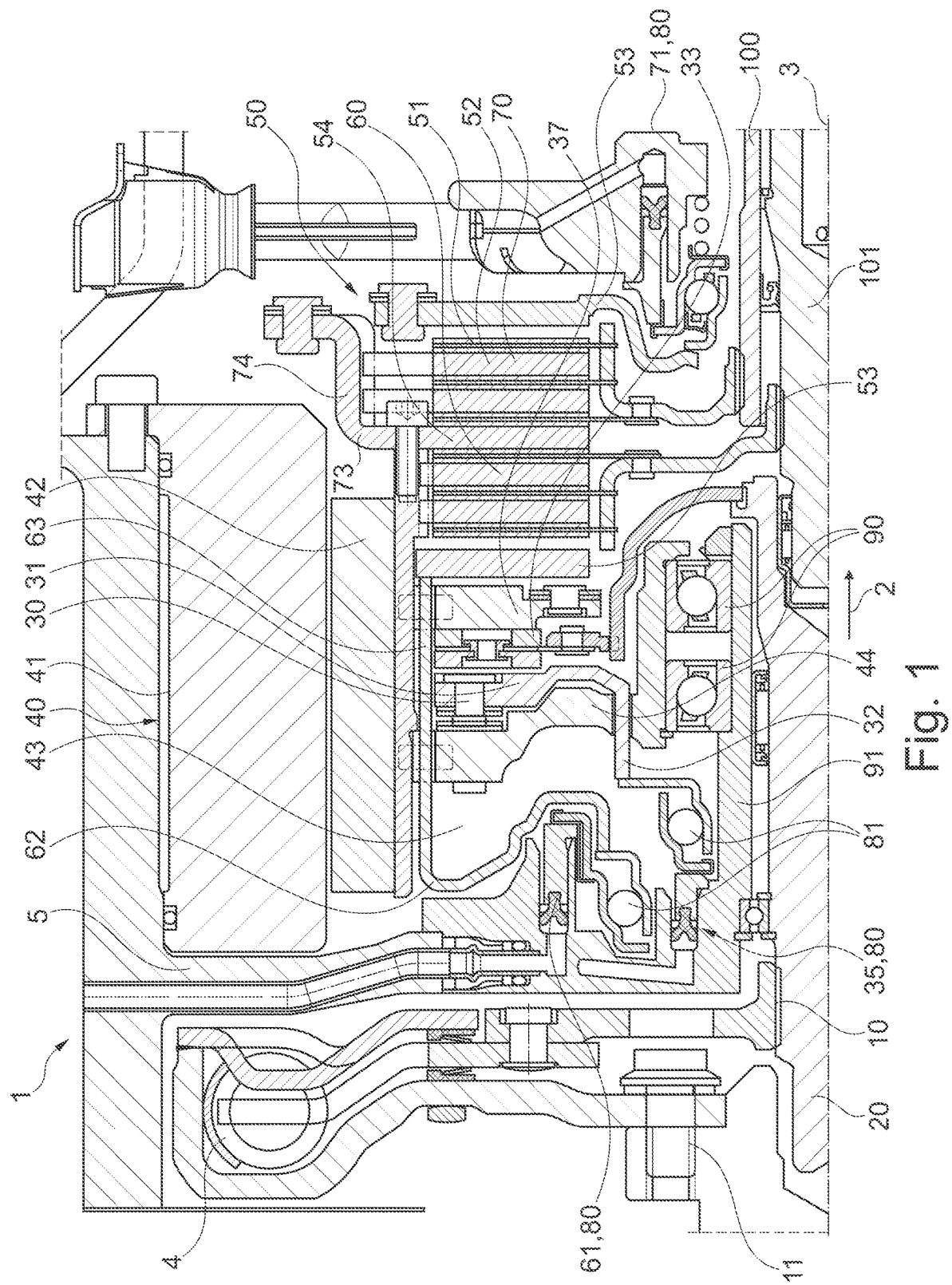
FIG. 1: shows a hybrid module according to the present disclosure in a first embodiment with an offset fastening section on the counter plate of the dual clutch device.

The present disclosure is not restricted in any way by the purely schematic drawings, and it should be noted that the illustrative embodiments shown in the drawings are not supposed to be restricted to the size ratios illustrated.

The figures are of a merely schematic nature and serve only for the comprehension of the present disclosure. Identical elements are provided with the same reference signs.

Elements in the individual illustrative embodiments can also be used in the other illustrative embodiments, being therefore interchangeable.

In a first illustrative embodiment, FIG. 1 shows a hybrid module 1, which has a connection device 10 along an arrangement direction 2 (shown horizontally here), which corresponds to the alignment of the common axis of rotation 3, it being possible, for example, for said connection device to be designed as a set of splines, and being formed on an intermediate shaft 20. Furthermore, the hybrid module 1 comprises, along the arrangement direction 2, a separating clutch 30, an electric motor 40 and a dual clutch device 50, which has a first component clutch 60 and a second component clutch 70. The first component clutch 60 is connected in a torque-transmitting manner to an inner transmission input shaft 101, and the second component clutch 70 is connected in a torque-transmitting manner to an outer transmission input shaft 100. The electric motor 40 can be used as an electric machine or, alternatively, or as a generator in energy recovery mode. The rotor 42 of the electric motor 40 can have a permanent magnet.

Contrary to the embodiment illustrated here, the separating clutch 30 can also be embodied as a multidisk clutch.

A torque produced by an internal combustion engine (not shown here) can be input into the intermediate shaft 20 via the crankshaft of the internal combustion engine 11 and the dual-mass flywheel 4 coupled thereto and via the connection device 10. From the intermediate shaft 20, the torque can be transmitted via the separating clutch 30 to the dual clutch device 50, which, depending on the actuation of one of the two component clutches 60, 70, passes the torque to the inner transmission input shaft 101 or the outer transmission input shaft 100. A torque produced by the electric motor 40 can likewise be transmitted by the dual clutch device 50 to the transmission input shafts 100, 101. Thus, depending on the actuation of the separating clutch 30, either the torque made available by the internal combustion engine can be passed in the direction of a coupled transmission and/or the torque made available by the electric motor 40 can be passed in the direction of the transmission.

If only the electric motor 40 is producing the driving torque, the separating clutch 30 is open, with the result that the internal combustion engine is decoupled and, if appropriate, can be switched off. When the separating clutch 30 is closed and a connected internal combustion engine and the electric motor 40 are simultaneously being operated, the electric motor 40 can corotate in the generator mode or, alternatively, can provide a "boost mode" by addition of the torque made available.

In the embodiment illustrated here, the electric motor 40 is secured on the stator side on a supporting wall 5. Within the stator 41 of the electric motor 40 there is a hollow-cylindrical stator 41, which is rotatably supported, being mounted on a rotor carrier 44. In this case, the rotor 42 surrounds a space 43, in which, according to the present disclosure, at least a section of at least one of the clutches, namely the separating clutch, the first component clutch and the second component clutch, is arranged. It is apparent that, as a result, a very compact and volume-saving construction of the hybrid module 1 can be achieved. In the embodiment illustrated in FIG. 1, the separating clutch 30 and the first component clutch 60 are arranged partially in the space 43 enclosed by the rotor 42. The second component clutch 70 is arranged outside the space 43 enclosed by the rotor 42.

The separating clutch 30 is assigned a separating clutch actuation system 35, which has a force transmission device 80 in the form of a pressure cylinder and a pressure piece 32 of the pressure plate 31. By actuation of the separating clutch actuation system 35, the pressure plate 31 is pressed by means of the pressure piece 32 onto a clutch disk 33, which, in turn, is supported on the counter plate 37. The clutch disk 33 is connected to the intermediate shaft 20 for conjoint rotation. A torque produced by an internal combustion engine (not shown here) connected to the connection device 10 can thus be transmitted by the intermediate shaft 20 and the clutch disk 33 to the pressure plate 31 and the counter plate 37, with the result that the rotor carrier 44 is set in rotation. The torque introduced in this way is made available via the rotor carrier 44 to the counter plate 54 of the dual clutch device 50, with the result that, by pressing together of the friction disks 51 and of the intermediate plates 52 by means of one of the pressure plates 53 of the dual clutch device 50, the torque is passed via the first component clutch 60 or the second component clutch 70 to the inner transmission input shaft 101 or the outer transmission input shaft 100.

In the embodiment illustrated in FIG. 1, both the first component clutch 60 and the second component clutch 70 are embodied as multidisk clutches. The actuation system 61 for the first component clutch 60 is situated on the same side of the electric motor 40 as the separating clutch actuation system 35, namely on the side which faces the connection device 10. In the embodiment illustrated here, at least a section of the separating clutch actuation system 35 and of the first actuation system 61 is positioned in the space 43 enclosed by the rotor in order to make optimum use of this space. The first actuation system 61, like the separating clutch actuation system 35, comprises a force transmission device 80 in the form of a pressure cylinder and an actuation bearing 81.

The present disclosure is not restricted to a pneumatically or hydraulically acting force transmission device 80; on the contrary, force transmission to a respective clutch can also alternatively be performed in a purely mechanical or electromechanical way.

The hybrid module furthermore has a "pressure pot" 62, which comprises at least one bridging element 63. In this case, the pressure pot 62 is arranged in such a way that it can be pushed in the direction of the first component clutch 60 by means of the force transmission device 80 of the first actuation system 61. In this arrangement, the bridging element 63 of the pressure pot 62 extends on the radially outer side of the separating clutch 30 and thus between the separating clutch 30 and the rotor 42 of the electric motor 40. It is apparent that the bridging element 63, of which there is preferably a plurality arranged in a manner distributed over the circumference of the pressure pot 62, extends through the rotor carrier 44 and the counter plate 37 of the separating clutch 30.

These bridging elements 63 can be of web- or bolt-like design, for example, and can form an integral part of the pressure pot 62 or, alternatively, can be part of the pressure plate 53. However, as an alternative, these bridging elements 63 can also jointly form a separate component or can be individual elements.

In the embodiment illustrated in FIG. 1, the second actuation system 71 for actuating the second component clutch 70 is arranged on the opposite side of the electric motor 40 from the connection device 10. This second actuation system also comprises a force transmission device 80, which is embodied as a pressure cylinder, and an actuation bearing 81. In the embodiment illustrated here, the counter plate 54 of the dual clutch device 50, which here performs the counter plate function for the first component clutch 60 and also for the second component clutch 70, extends into the space surrounded by the stator 41 within the electric motor 40. A fastening section 73 is formed on the counter plate 54, said section having an offset 74 by means of which this fastening section 73 passes out of the space surrounded by the stator 41 to provide reliable mechanical fastening.

The offset 74 of the fasting section 73 is embodied as a disk carrier and supports the intermediate plates 52, designed in a manner similar to disks, in the radial and circumferential directions.

The rotor carrier 44, the separating clutch 30 and the dual clutch 50 are mounted on a common bearing location 90, which is formed by a plurality of rolling bearings supported on a common bearing carrier 91.

In the illustrative embodiment shown in FIG. 1, all three clutches 30, 60, 70 are embodied as directly actuated, active clutches. At least in the case of the separating clutch 30 and of the first component clutch 60, the force transmission devices 80 provided for the actuation of the clutches 30, 60, 70 are concentrically arranged working or pressure cylinders, referred to as dual concentric slave cylinders (CSC), the housings of which are connected to the supporting wall 5 arranged between the dual-mass flywheel 4 and the electric motor 40.

The separating clutch 30 is actuated by the radially inner one of the two force transmission devices 80. The actuation of the first component clutch 60 is performed by the force transmission device 80, which is offset radially outward and is provided for the first component clutch 60 as part of the first actuation system 61.

From FIG. 1 it can be seen that the separating clutch actuation system 35 and the first actuation system 61 are arranged in a very space-saving way in that the force transmission device 80 for the separating clutch actuation system 35 is arranged axially adjacent to the associated actuation bearing 81, and the actuation device 80 for the first actuation system 61 is arranged radially above the associated actuation bearing 81. As a result, the space 43 surrounded by the rotor 42 can be used in an optimum manner while at the same time satisfying the requirements on actuation path lengths of the two clutches 30, 60. Moreover, the diameters of the actuation bearings 81, of the separating clutch actuation system 35 and of the first actuation system 61 can be made relatively small, thereby making it possible to reduce the bearing drag torques.

The first component clutch 60 and the second component clutch 70 of the dual clutch device 50 are designed as multidisk clutches, which each comprise three friction disks 51. This gives rise to six friction surfaces per component clutch 60, 70, and therefore conventional contact pressure forces are sufficient to enable a relatively high torque to be transmitted. This is made possible despite the relatively small clutch diameter due to arrangement within the electric motor 40.

In addition to the already described advantage of the small overall volume, the hybrid module 1 has the further advantage that, by virtue of the compact arrangement of the clutch elements required for the actuation of the clutches, several clutches can be made available with multifunction capability. Thus, it is possible for a plurality of supply lines or supply and control cables to be arranged circumferentially offset in the supporting wall 5, ensuring that the axial installation space does not increase, even when there is a plurality of supply elements.

Figure 2:
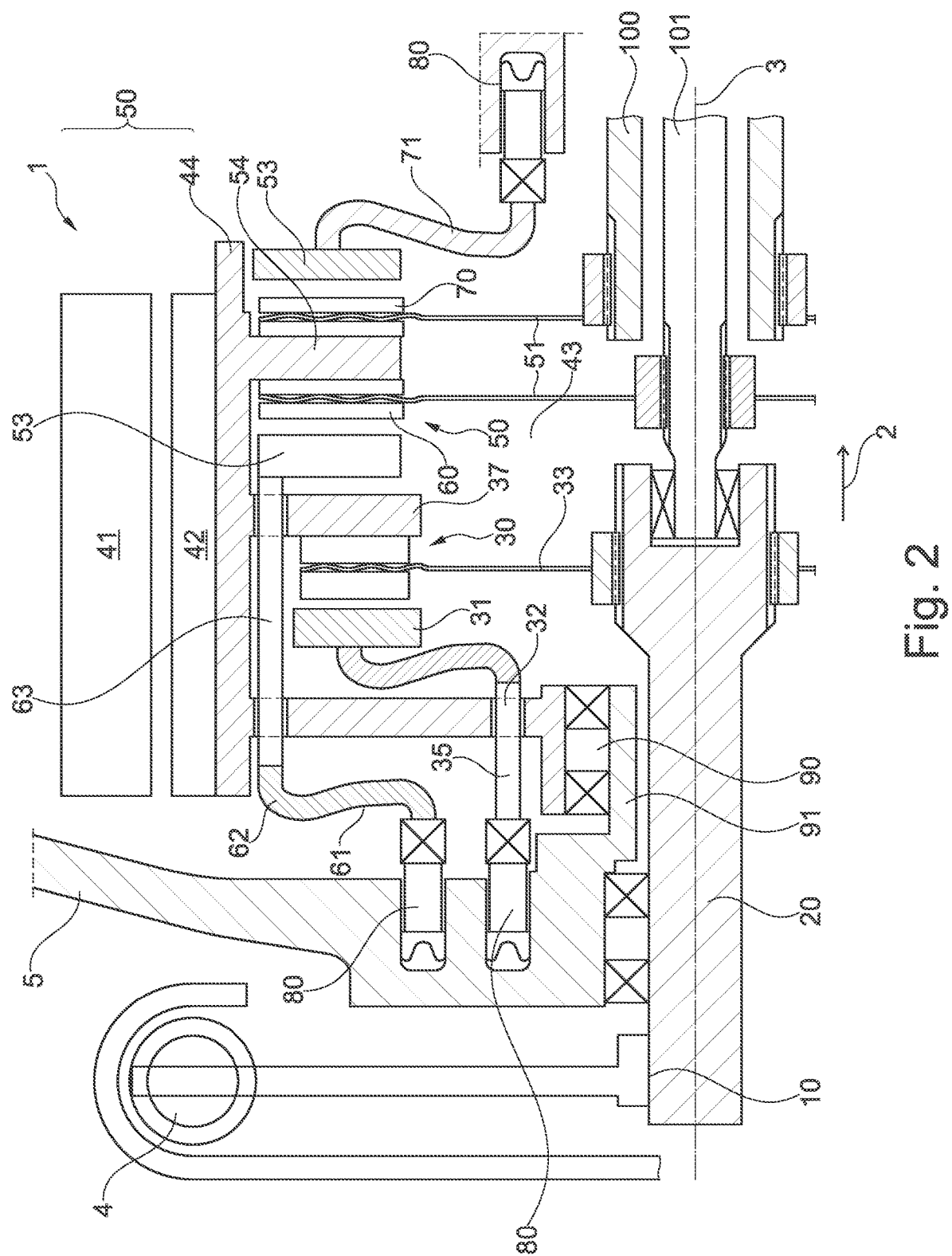
FIG. 2: shows a hybrid module according to the present disclosure in a second embodiment with all the clutches arranged in the space enclosed by the rotor.

FIG. 2 shows a hybrid module according to the present disclosure which is largely identical to the hybrid module illustrated in FIG. 1, with the difference that, in the embodiment illustrated in FIG. 2, the separating clutch 30, the first component clutch 60 and the second component clutch 70 are arranged in the space 43 surrounded by the rotor 42 of the electric motor 40.

Figure 3:
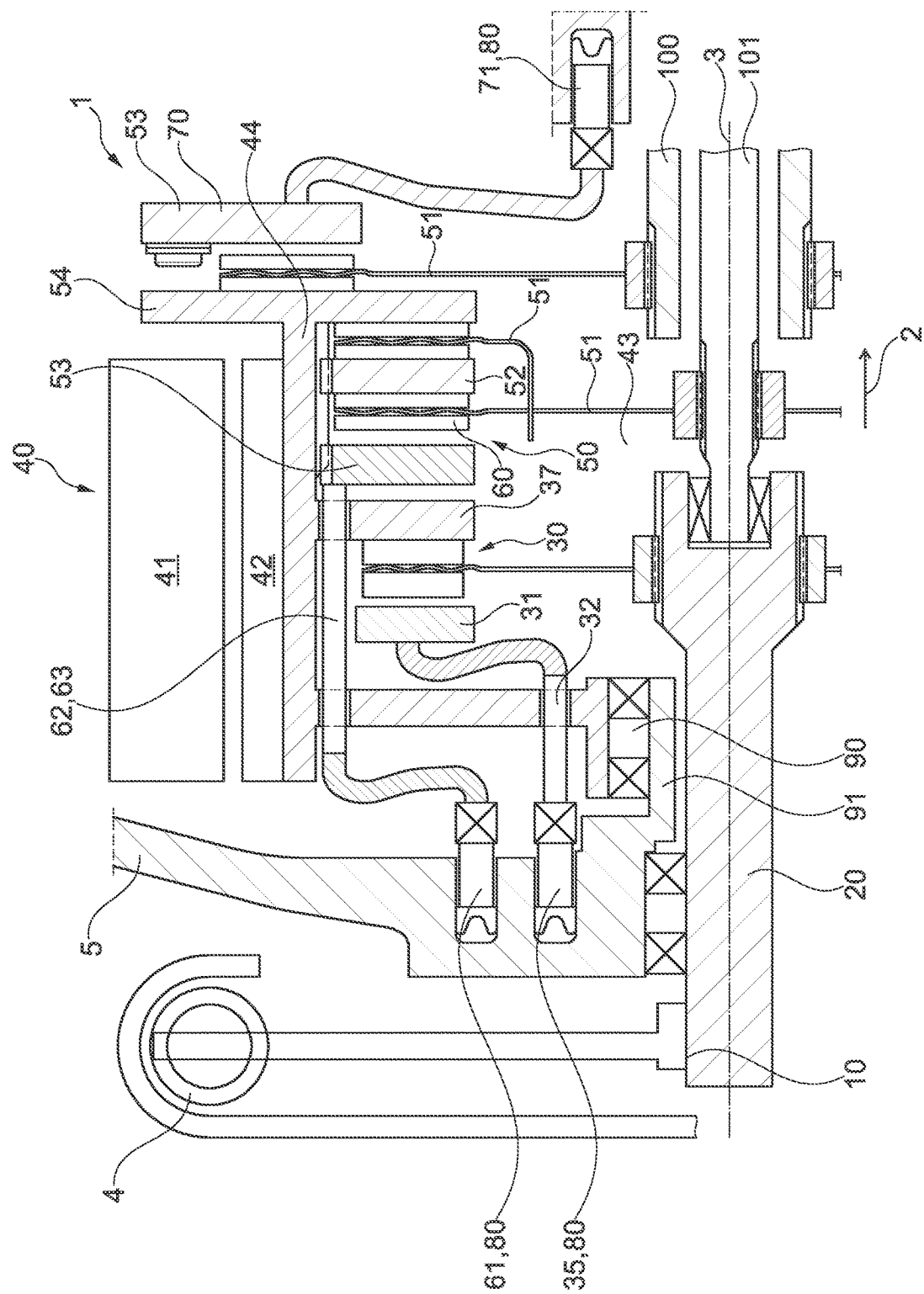
FIG. 3: shows a hybrid module according to the present disclosure in a third embodiment with the first component clutch embodied as a multidisk clutch and a radially large second component clutch.

FIG. 3 also shows an embodiment which is similar to that in FIG. 1 but which differs from the embodiment illustrated in FIG. 1 inasmuch as here only the first component clutch 60 is embodied as a multidisk clutch, and the second component clutch 70 is embodied as a radially larger clutch, which is arranged completely outside the space 43 enclosed by the electric motor 40. In this case, the rotor carrier 44 forms the counter plates of the clutches 30, 60, 70, wherein, for the second component clutch 70, it forms a counter plate region which is situated significantly further out radially than the counter plates of the separating clutch 30 and also the counter plate of the first component clutch 60. Since a higher torque can be transmitted with a multidisk clutch than with a single-disk clutch, reliable transmission of a high torque by the dual clutch device 50 is ensured by virtue of the embodiment of the first component clutch 60 as a multidisk clutch and of the second component clutch 70 with a relatively large diameter.

Figure 4:
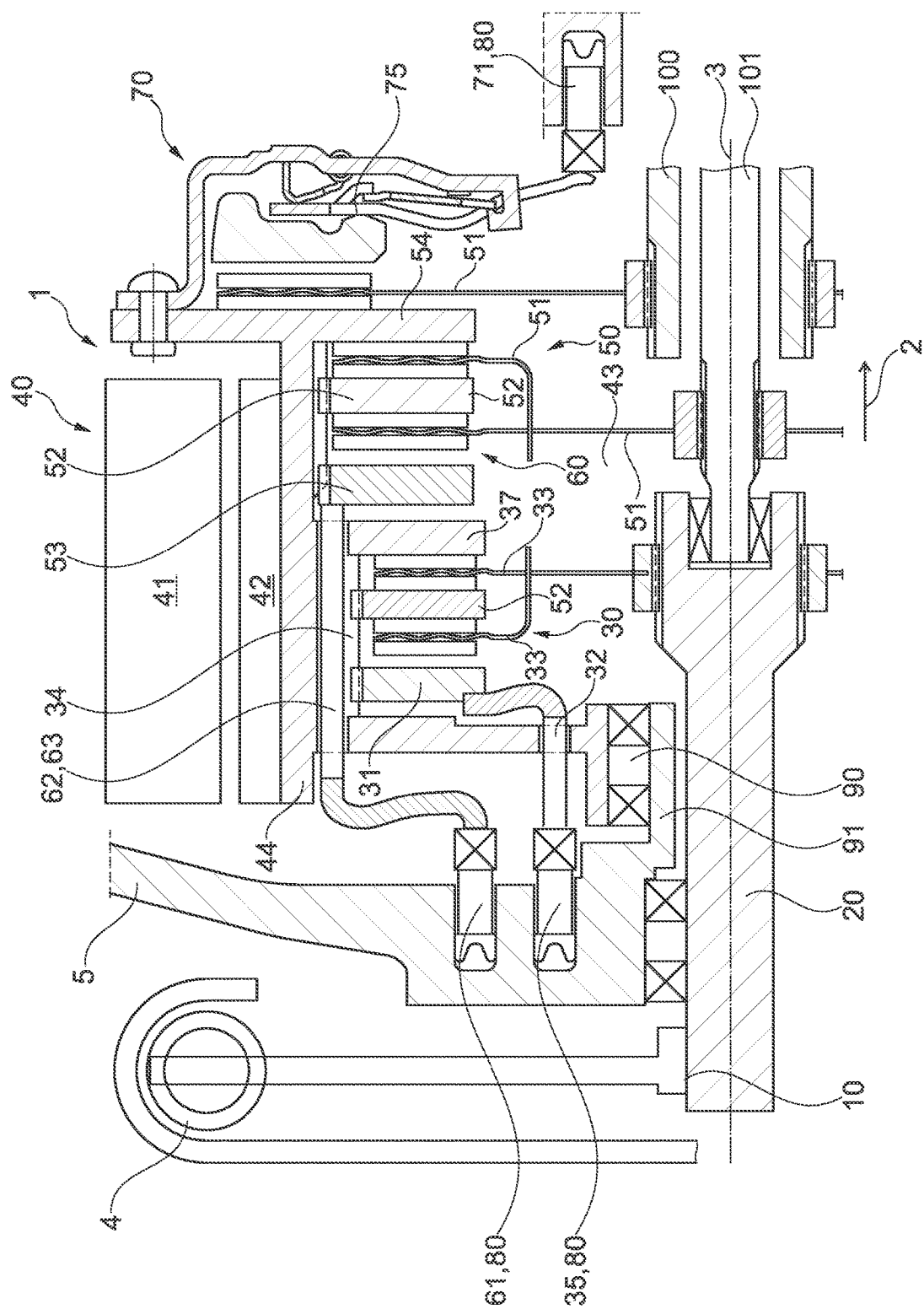
FIG. 4: shows a hybrid module according to the present disclosure in a fourth embodiment with the separating clutch embodied as a multidisk clutch and a lever-actuated second component clutch in a radially large embodiment.

The illustrative embodiment of the hybrid module 1 according to the present disclosure which is shown in FIG. 4 is once again configured in a manner which largely corresponds to the hybrid module 1 illustrated in FIG. 3, with the difference that, in this case, not only the first component clutch 60 but also the separating clutch 30 are embodied as multidisk clutches. In the embodiment illustrated here, the second component clutch 70 is furthermore fitted with a lever mechanism 75. The separating clutch 30 has a translation guide 34, which implements axial guidance of a pressure plate 31 and of an intermediate plate 52. The pressure plate 31 and also the intermediate plate 52 are thereby secured against corotation, i.e. against rotating relative to the clutch. The special feature of this embodiment is, in particular, that, in this case, translation guides 34 and bridging elements 63 for actuating the first component clutch 60 are arranged alternately along the circumference of the separating clutch 30. This means that translation guide elements 34 are arranged in spaces or gaps between bridging elements 63 in order to ensure reliable operation of the hybrid module even at relatively high torques, despite restricted installation space conditions.

The embodiment of the second component clutch 70 with a lever mechanism 75 has the effect that higher contact pressure forces can be achieved in the second component clutch 70, thus also enabling the torque that can be transmitted by the second component clutch 70 to be increased. Here, springs used in the lever mechanism 75 are embodied as lever springs or diaphragm springs. The advantage of this embodiment resides, in particular, in the ability to transmit high torques and in the use of established, reliable and economical clutch designs.

Figure 5:
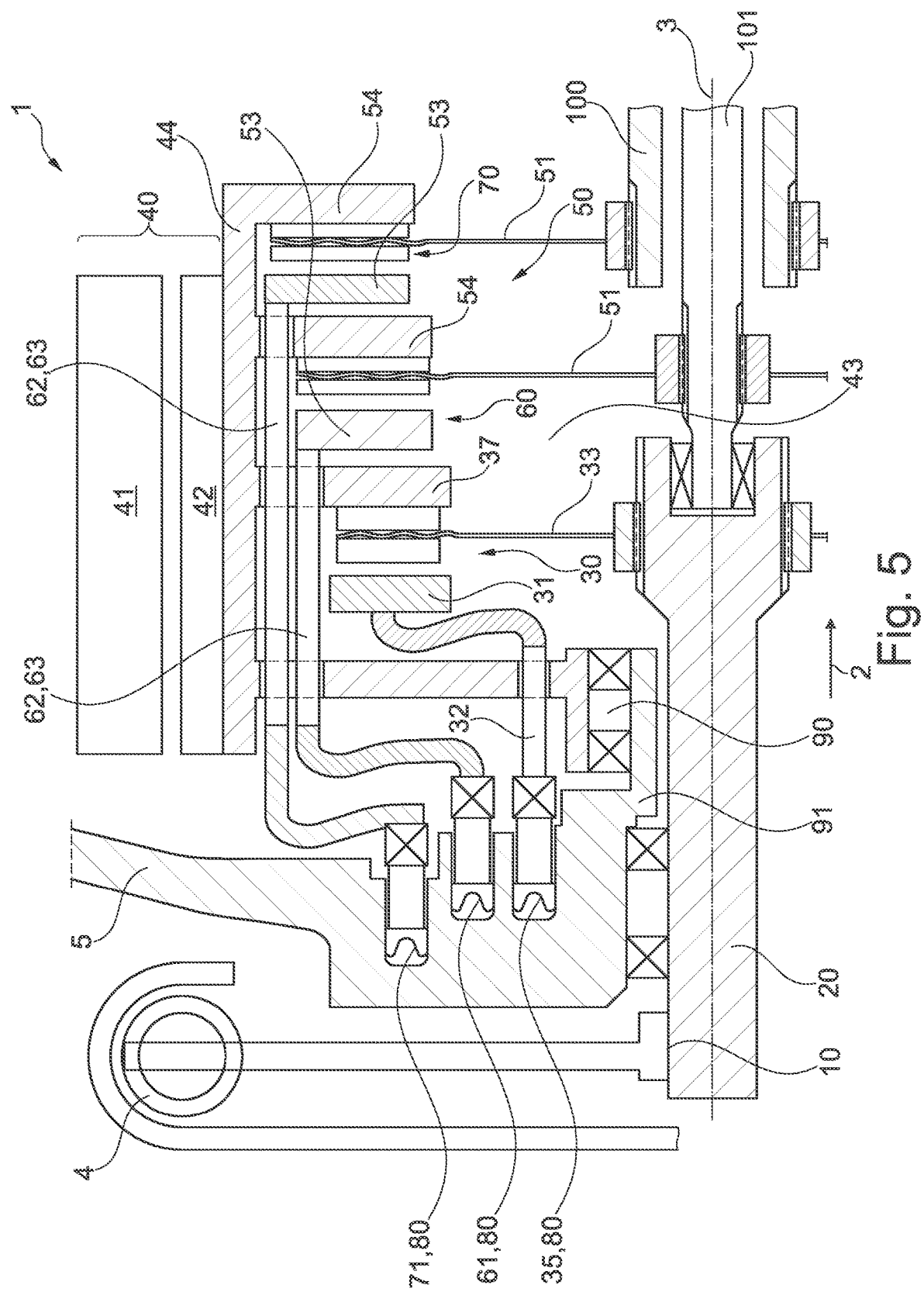
FIG. 5: shows a hybrid module according to the present disclosure in a fifth embodiment, in which the actuation systems of all the clutches are arranged on the side of the electric motor facing the connection device.

The illustrative embodiment of a hybrid module according to the present disclosure which is illustrated in FIG. 5 has the special feature that the separating clutch actuation system 35, the first actuation system 61 and also the second actuation system 71 are arranged on the side of the electric motor 40 which faces the connection device 10. This is achieved by virtue of the fact that both the first actuation system 61 and the second actuation system 71 have a pressure pot 62, which comprises bridging elements 63 that extend radially on the outside of the separating clutch 63 and bridge the latter. Here, the bridging elements 63 assigned to the second actuation system 71 are arranged radially to the outside of the bridging elements 63 assigned to the first actuation system 61. However, the embodiment illustrated in FIG. 5 can also be modified such that the bridging elements assigned to the first component clutch 60 are arranged alternately with bridging elements assigned to the second component clutch 70 in a circumferential surface. This has the advantage that there is no need to provide installation space above the separating clutch 30 in which bridging elements for the first component clutch 60 and for the second component clutch 70 are arranged radially adjacent to one another.

Figure 6:
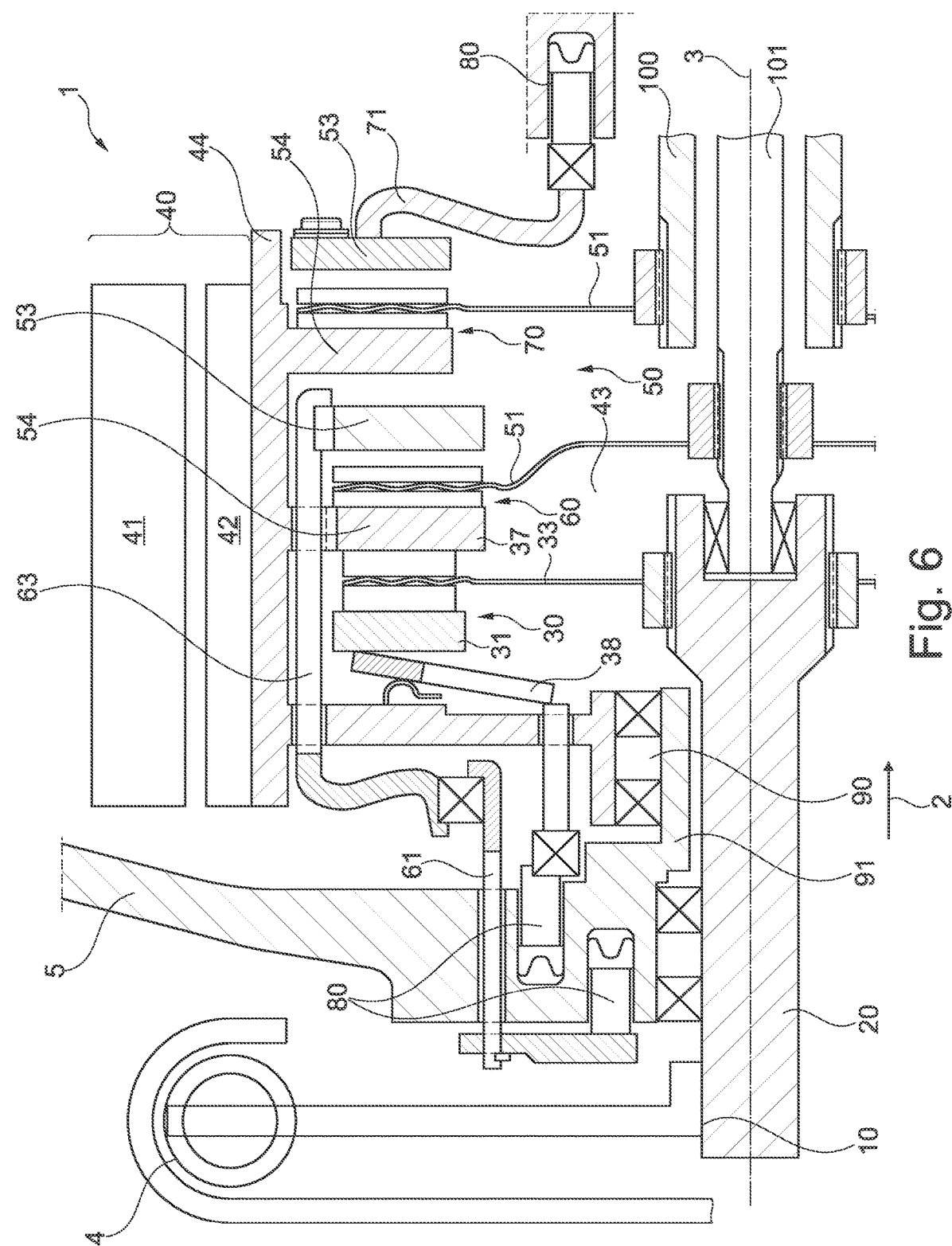
FIG. 6: shows a hybrid module according to the present disclosure in a sixth embodiment, in which the separating clutch is embodied as a lever-actuated clutch and the first component clutch is actuated by means of a traction means.

The embodiment of the hybrid module 1 according to the present disclosure which is illustrated in FIG. 6 is once again implemented in a similar way to the embodiment illustrated in FIG. 2. The special feature of the embodiment illustrated in FIG. 6 is, in particular, that the separating clutch 30 is embodied as an active clutch, with the result that the force transmission device 80 for the separating clutch 30 and the pressure plate 31 move in opposite directions, wherein the contact pressure force in the separating clutch 30 is not applied by the force transmission device 80 thereof but by the diaphragm spring 38 which is provided here.

The first actuation system 61 comprises bridging elements 63, which are here embodied as tie rods. Consequently, the force transmission device 80 assigned to the first component clutch 60 is arranged facing away from the dual clutch device 50 in order to exert a tension force on the bridging element 63 for actuating the first component clutch 60.

Here, the illustrative embodiments shown in FIGS. 1 to 6 are illustrated merely in simplified form. In contrast to the illustrative embodiments shown here, hybrid modules to be implemented in practice can be of split design, especially in the region of the rotor carrier 44, of the rotor 42, of the electric motor 40 and of the counter plates 37, 54, in order to allow assembly of the hybrid module 1.

LIST OF REFERENCE SIGNS 1 hybrid module
2 arrangement direction
3 axis of rotation
4 dual-mass flywheel
5 supporting wall
10 connection device
11 crankshaft of the internal combustion engine
20 intermediate shaft
30 separating clutch
31 pressure plate
32 pressure piece of the pressure plate
33 clutch disk
34 translation guide
35 separating clutch actuation system
37 counter plate
38 diaphragm spring
40 electric motor
41 stator
42 rotor
43 space enclosed by the rotor
44 rotor carrier
50 dual clutch device
51 friction disk
52 intermediate plate
53 pressure plate
54 counter plate
60 first component clutch
61 first actuation system
62 pressure pot
63 bridging element
70 second component clutch
71 second actuation system
73 fastening section
74 offset of the fastening section
75 lever mechanism
80 force transmission device
81 actuation bearing
90 common bearing location
91 bearing carrier
100 outer transmission input shaft
101 inner transmission input shaft

What is claimed is:

1. A hybrid module for coupling to an internal combustion engine of a motor vehicle, comprising:
   a connection device for mechanically coupling to the internal combustion engine;
   a separating clutch configured for transmitting torque from the internal combustion engine to the hybrid module and for separating the hybrid module from the internal combustion engine;
   an electric motor configured for producing a drive torque, the electric motor having a hollow-cylindrical rotor;
   a dual clutch device configured for transmitting torque from at least one of the electric motor or the separating clutch to a drive train, the dual clutch device having a first component clutch and a second component clutch;
   a separating clutch actuation system configured for actuating the separating clutch;
   a first actuation system configured for actuating the first component clutch; and
   a second actuation system configured for actuating the second component clutch,
   the connection device, the separating clutch and at least one of the first component clutch or the second component clutch being arranged substantially in series along an arrangement direction, and at least a section of at least one of the separating clutch, the first component clutch or the second component clutch being arranged within a space enclosed by the hollow-cylindrical rotor,
   along the arrangement direction, the separating clutch actuation system and the first actuation system being arranged on a side of the electric motor facing the connection device, the first actuation system surrounding the separating clutch actuation system.

2. The hybrid module as claimed in claim 1 wherein, along the arrangement direction, the second actuation system being arranged on the side of the electric motor facing the connection device.

3. The hybrid module as claimed in claim 1 wherein the second component clutch has a greater radial extent than the first component clutch, the second component clutch being arranged on a side of the electric motor facing away from the connection device.

4. The hybrid module as claimed in claim 1 wherein the separating clutch actuation system has a force transmission device and an actuation bearing forming a unit, the first actuation system having a force transmission device and an actuation bearing forming a unit, the unit of the separating clutch actuation system and the unit of the first actuation system being arranged at least one of radially or axially offset relative to one another.

5. The hybrid module as claimed in claim 4 wherein the force transmission device of the separating clutch actuation system and the force transmission device of the first actuation system are each a pressure cylinder.

6. The hybrid module as claimed in claim 1 wherein the dual clutch device has a counter plate configured for performing a counter plate function for at least one of the first component clutch or the second component clutch.

7. The hybrid module as claimed in claim 6 wherein the counter plate is connected mechanically to the hollow-cylindrical rotor of the electric motor, a fastening portion being arranged on the counter plate, the fastening portion being embodied with an offset such that the fastening portion extends away from the counter plate in radial and axial directions.

8. The hybrid module as claimed in claim 1 wherein the first actuation system has at least one bridging element, the at least one bridging element extending on a radially outer side of the separating clutch for actuating the first component clutch.

9. The hybrid module as claimed in claim 8 wherein the separating clutch has at least one of a pressure plate or an intermediate plate, the separating clutch having a translation guide configured for translationally moving the at least one of the pressure plate or intermediate plate toward a counter plate of the separating clutch, the at least one bridging element being a plurality of bridging elements, the translation guide being arranged between the bridging elements in a circumferential direction.

10. The hybrid module as claimed in claim 1 wherein at least one of the first actuation system, the second actuation system or the separating clutch has a lever mechanism configured for multiplying a contact pressure force.

11. The hybrid module as recited in claim 1 wherein clutch plates of the separating clutch are axially between the first actuation system and clutch plates of the first component clutch.

12. The hybrid module as recited in claim 1 wherein the separating clutch is arranged within the space enclosed by the rotor.

13. A drive arrangement for a motor vehicle comprising:
an internal combustion engine;
the hybrid module as claimed in claim 1; and
a transmission, the hybrid module being connected mechanically to the internal combustion engine and the transmission by the separating clutch and at least one of the first component clutch and the second component clutch.

14. A method of constructing a hybrid module for coupling to an internal combustion engine of a motor vehicle, comprising:
providing a connection device for mechanically coupling to the internal combustion engine;
drivingly coupling an input of a separating clutch to the connection device;
drivingly coupling a rotor of an electric motor to an output of the separating clutch, the electric motor configured for producing a drive torque, the separating clutch configured for transmitting torque from the internal combustion engine to the rotor and for separating the rotor from the internal combustion engine;
coupling an input of a dual clutch device to the rotor, the dual clutch device configured for transmitting torque from at least one of the electric motor or the separating clutch to a drive train, the dual clutch device having a first component clutch and a second component clutch; and
providing a separating clutch actuation system configured for actuating the separating clutch, a first actuation system configured for actuating the first component clutch, and a second actuation system configured for actuating the second component clutch,
at least a section of at least one of the separating clutch, the first component clutch or the second component clutch being arranged within a space enclosed by the rotor,
the separating clutch actuation system and the first actuation system being arranged on a side of the separating clutch facing the connection device.

15. The method as recited in claim 14 wherein the connection device, the separating clutch and at least one of the first component clutch or the second component clutch are arranged substantially in series along an arrangement direction.

16. A hybrid module for coupling to an internal combustion engine of a motor vehicle, comprising:
an electric motor configured for producing a drive torque, the electric motor including a rotor;
a shaft for mechanically coupling to the internal combustion engine;
a separating clutch configured for transmitting torque from the internal combustion engine to the rotor and for separating the rotor from the internal combustion engine;
a dual clutch device configured for transmitting torque from the rotor to a drive train;
a separating clutch actuation system configured for actuating the separating clutch; and
a first actuation system configured for actuating a first component clutch of the dual clutch device,
at least a section of at least one of the separating clutch or the first component clutch being arranged within a space enclosed by the rotor,
the separating clutch actuation system and the first actuation system being arranged on a side of the separating clutch configured for facing the internal combustion engine.

17. The hybrid module as recited in claim 16 wherein the dual clutch device includes a second component clutch and a second actuation system configured for actuating the second component clutch, the second actuation system being arranged on a side of the separating clutch configured for facing away from the internal combustion engine or on the side of the separating clutch configured for facing the internal combustion engine.

18. The hybrid module as recited in claim 17 wherein the shaft includes a connection device for mechanically coupling to the internal combustion engine,
the connection device, the separating clutch and at least one of the first component clutch or the second component clutch being arranged substantially in series along an arrangement direction.

19. The hybrid module as recited in claim 16 wherein the first actuation system includes a bridging element extending axially along the separating clutch.

20. The hybrid module as recited in claim 19 wherein the dual clutch device includes a pressure plate arranged for engaging the first component clutch, the pressure plate being arranged on a side of the separating clutch configured for facing away from the internal combustion engine, the bridging element configured for actuating the pressure plate to engage the first component clutch.

* * * * *